US007672991B2

(12) United States Patent
Moreau et al.

(10) Patent No.: US 7,672,991 B2
(45) Date of Patent: Mar. 2, 2010

(54) METHOD AND DEVICE FOR CONFIGURING AN ELECTRONIC DOCUMENT PROCESSING PERIPHERAL IN A COMMUNICATION NETWORK

(75) Inventors: Jean-Jacques Moreau, Rennes (FR); Herve Dias, Saint Malo (FR); Francois Delumeau, Paris (FR)

(73) Assignee: Canon Research Centre France S.A., Paris (FR)

( * ) Notice: Subject to any disclaimer, the term of this patent is extended or adjusted under 35 U.S.C. 154(b) by 885 days.

(21) Appl. No.: 09/923,360

(22) Filed: Aug. 8, 2001

(65) Prior Publication Data
US 2002/0078337 A1    Jun. 20, 2002

(30) Foreign Application Priority Data
Aug. 29, 2000 (FR) .................................. 00 11027

(51) Int. Cl.
*G06F 15/16* (2006.01)
(52) U.S. Cl. .................. 709/203; 709/201; 709/217; 709/218; 709/219; 709/220; 709/221; 709/223; 709/224; 709/225; 709/226; 709/232
(58) Field of Classification Search ......... 709/217–227, 709/232, 201, 203; 705/8
See application file for complete search history.

(56) References Cited

U.S. PATENT DOCUMENTS

| 5,638,511 | A  | * | 6/1997  | Nezu .............................. 726/5 |
| 5,710,884 | A  | * | 1/1998  | Dedrick ...................... 709/217 |
| 5,771,354 | A  | * | 6/1998  | Crawford .................... 709/229 |
| 5,872,895 | A  | * | 2/1999  | Zandee et al. ................ 358/1.9 |
| 5,892,900 | A  | * | 4/1999  | Ginter et al. .................. 726/26 |
| 6,028,927 | A  |   | 2/2000  | Delumeau et al. ........... 379/386 |
| 6,108,344 | A  |   | 8/2000  | Delumeau .................... 370/445 |
| 6,154,733 | A  | * | 11/2000 | Pierce et al. ................. 705/408 |
| 6,163,383 | A  | * | 12/2000 | Ota et al. ..................... 358/1.1 |
| 6,195,696 | B1 | * | 2/2001  | Baber et al. ................. 709/223 |
| 6,327,045 | B1 | * | 12/2001 | Teng et al. .................. 358/1.15 |
| 6,611,349 | B1 | * | 8/2003  | Vogt et al. .................. 358/1.15 |
| 6,624,828 | B1 | * | 9/2003  | Dresevic et al. ............. 715/771 |
| 6,628,415 | B2 | * | 9/2003  | Lawrence et al. .......... 358/1.15 |
| 6,636,329 | B2 | * | 10/2003 | Koppich et al. ............ 358/1.15 |
| 6,690,481 | B1 | * | 2/2004  | Yeung et al. ................ 358/1.15 |
| 6,693,718 | B1 | * | 2/2004  | Takaoka ..................... 358/1.15 |
| 6,877,093 | B1 | * | 4/2005  | Desai et al. ................. 713/156 |
| 7,096,148 | B2 | * | 8/2006  | Anderson et al. ........... 702/134 |

FOREIGN PATENT DOCUMENTS

| EP | 0926587 A1 | 6/1999 |
| WO | WO 96/01456 | 1/1996 |

\* cited by examiner

*Primary Examiner*—Nathan Flynn
*Assistant Examiner*—Mohammad A Siddiqi
(74) *Attorney, Agent, or Firm*—Fitzpatrick, Cella Harper & Scinto

(57) ABSTRACT

The invention concerns a method and device for configuring an electronic document processing peripheral. The invention concerns more particularly a method of determining a configuration profile for an electronic document processing peripheral with the configuration profile representing a set of parameters defining a particular configuration of the peripheral. To do so, the electronic document processing peripheral determines user characteristics as a function of a user identification of a data item and then determines, as a function of the user characteristics, a configuration profile applicable for configuring the peripheral.

24 Claims, 8 Drawing Sheets

| User | Level of service |
|---|---|
| Fred | 1 |
| John | 3 |
| Bob | 2 |

*FIG. 7*

| Peripheral | Level of service | Configuration profile |
|---|---|---|
| printer1 | 1 | P1.1 |
| printer1 | 3 | P1.3 |
| fax1 | 1 | F1.1 |
| printer2 | 2 | P2.2 |

*FIG. 8*

METHOD AND DEVICE FOR CONFIGURING AN ELECTRONIC DOCUMENT PROCESSING PERIPHERAL IN A COMMUNICATION NETWORK

The present invention concerns in general terms the configuration of electronic document processing peripherals, and in particular when these peripherals can be used via a communication network.

The invention concerns a method of configuring an electronic document processing peripheral. The invention concerns more particularly a method of determining a configuration profile for an electronic document processing peripheral, said configuration profile representing a set of configuration parameters for the peripheral, a set of fixed values of said parameters defining a particular configuration of the peripheral. The invention also concerns a method of obtaining a given configuration profile in accordance with the invention.

The invention also concerns devices able to implement the aforementioned methods.

In the following description, the invention will be described in the context where the computer peripheral in question can be used through a communication network. However, the invention also applies when the computer peripheral is connected to a user machine not connected to a network.

In communication networks, it is usual for electronic document processing peripherals to be accessible to and usable by a set of users connected to the network via a client station such as a microcomputer.

The processing peripherals include both document printing devices, such as a printer or an electronic whiteboard associated with a printer, and document transmission devices, such as a facsimile machine, a modem and in general terms any type of communication interface to the outside of the communication network in question. These peripherals can also be document acquisition devices, such as a scanner, or possibly document storage devices.

Generally these peripherals are grouped together according to their specialisation, for example the printing of computer documents, and accessible via a server dedicated to managing and configuring these peripherals.

These peripherals generally have parameterisable operating modes whose parameters are fixed by a dialogue between the user and the server dedicated to managing these peripherals.

Thus, in the case of a printer, the configuration thereof notably takes account of the parameters concerning the colour or black and white print mode, the print quality, etc.

For example, the parameters acting on the print quality can determine the use of a mechanism known as the "error diffusion mechanism", or that of a character font smoothing mechanism, or that of a "fine" print mode.

Conventionally, for a particular peripheral, the type of modifiable configuration parameters and the possible values of these parameters are the same for all users.

However, it may be useful in certain cases to have the possibility of personalising the configuration characteristics of the peripheral according to predefined characteristics related to the users of this peripheral.

For example, if the case of a company network is considered, the users of the network not all having the same responsibilities and the same field of activity within the company, they will not necessarily have the same rights of access to the peripherals in service on the network. By way of example, a user of the accounting service will perhaps have access to a colour printer, but will not be authorised to print in colour on this printer.

It may thus be necessary to limit, for a given type of user, the possible values of certain configuration parameters of the peripheral.

Moreover, if the Internet is considered, on which there is a prodigious growth in services offered to the user in the context of electronic commerce, it can be envisaged being able to offer to the users paid services for the remote use of data processing peripherals such as the printing of documents. In this case, the use of the peripherals is subject to prior payment by the user. For example, a user will pay a certain tariff for printing a document in black and white, and a higher tariff for printing in colour. In practice, since the printing can be carried out in both cases by the same peripheral, it will therefore be necessary to limit the possible value of the configuration parameters of the peripheral according to the payment made by the user.

In this context, there will therefore be a real need to be able to adapt the configuration characteristics of a peripheral accessible via a communication network, according to characteristics related to the user.

The purpose of the present invention is to provide a response to the need expressed above.

To this end, according to a first aspect, the invention concerns a method of determining a configuration profile for an electronic document processing peripheral, said configuration profile being representative of a set of configuration parameters for said peripheral, a set of fixed values of said parameters defining a particular configuration of the peripheral. The method is characterised in that it comprises the following steps:

obtaining a user identification data item;

determining user characteristics as a function of the user identification data item;

determining, as a function of the user characteristics, a configuration profile applicable for configuring said peripheral.

By determining in this way a configuration profile for the peripheral, it is thus possible to adapt the configuration characteristics of the peripheral according to the predefined characteristics related to the user.

According to a preferred embodiment of the invention, the method of determining a configuration profile according to the invention is implemented in a communication network having at least one client station, one server station, and at least one processing peripheral. The method is implemented in response to a request sent from a client station to the server station and includes, before the step of determining a configuration profile, the following step:

obtaining a peripheral identification data item, the configuration profile applicable then being determined as a function of said user characteristics and said peripheral identification data item.

Thus, in the context of a communication network in which a plurality of peripherals are accessible to the users, generally via a server station managing access to the peripherals, it is possible to adapt the configuration characteristics of each peripheral according to the characteristics related to each user.

According to a characteristic embodiment of the invention, the user identification and peripheral identification data are extracted from the request sent by a client station to the server station, said request being able to be a document processing request, or a request to obtain a configuration profile.

According to a preferred embodiment, the steps of determining user characteristics and determining a configuration profile are accomplished by means of a database in which there are stored, associated together, peripheral data each being representative of the identity of a peripheral, user data being representative of user characteristics, and configuration data each being representative of a configuration profile.

In this way, the server has a database making it possible to personalise the configuration profiles of one or more peripherals according to users having or being able to have access to these peripherals via the server. In addition, the database can be regularly updated.

According to one characteristic of the invention, the method of determining a configuration profile also includes the following step:

if required by the client station, updating the configuration of said peripheral in the context of the configuration profile applicable.

Thus the user has the possibility of changing the values of the configuration parameters which he wishes to modify, in the context of the configuration profile determined for him.

According to a particular embodiment of the invention, the configuration updating step includes the following steps:

receiving from the client station a request for obtaining the configuration profile applicable;

determining and sending to the client station the configuration profile applicable;

receiving from the client station the configuration profile applicable with at least one of the parameters having a modified value.

According to a second aspect, the invention concerns a method of obtaining a configuration profile determined according to a method of determining a configuration profile as defined above. The method of obtaining a configuration profile is characterised in that it comprises the following steps, implemented in a client station:

generating and sending to the server station a request to configure an electronic document processing peripheral, said request containing a user identification data item and a peripheral identification data item;

receiving a configuration profile of said peripheral from the server station, in response to the configuration request.

In this way, the invention notably enables a user to be able to consult the configuration profile to which he is "entitled" relatively to a peripheral chosen by him.

According to a preferred embodiment, the method of obtaining a configuration profile also includes the following steps:

displaying said configuration profile;

modifying a current configuration associated with the configuration profile;

sending to the server station the configuration profile containing the modified configuration.

The invention also concerns, in association with the methods disclosed above, a method of configuring an electronic document processing peripheral, characterised in that it includes the steps of a method of determining a configuration profile in accordance with the invention.

According to a preferred embodiment, the configuration method also includes the steps of a method of obtaining a configuration profile in accordance with the present invention.

Correlatively, the invention also concerns a device for determining a configuration profile for an electronic document processing peripheral. The device is characterised in that it has means able to implement a method of determining a configuration profile as defined above.

The invention also concerns a device for obtaining a configuration profile characterised in that it comprises means able to implement a method of obtaining a configuration profile as defined above.

The invention also concerns a device for configuring an electronic document processing peripheral, characterised in that it comprises a device for determining a configuration profile and/or a device for obtaining a configuration profile, in accordance with the invention.

The invention also relates to a server station connected to a communication network, characterised in that it comprises a device for determining a configuration profile for an electronic document processing peripheral, in accordance with the invention.

The invention correlatively relates to a client station connected to a communication network, characterised in that it comprises a device for obtaining a configuration profile, in accordance with the invention.

The invention also relates to a communication network including at least one server station in accordance with the invention, and at least one client station in accordance with the invention.

The invention also relates to a computer comprising means adapted to implement the method or methods according to the invention as disclosed above.

The invention also relates to a computer program having one or more sequences of instructions able to implement the method or methods according to the invention as disclosed above, when this program is executed by a computer.

The invention also relates to an information carrier, such as a diskette or a compact disc (CD), characterised in that it contains such a computer program.

The advantages of these devices, stations, computer, computer program and information carrier are identical to those of the methods as succinctly disclosed above.

Other particularities and advantages of the invention will also emerge from the following description. In the accompanying drawings, given by way of non-limitative examples:

FIG. 7 depicts an example of a table according to the invention, in which there are stored user identification data associated with data representing user characteristics;

FIG. 8 depicts an example of a table according to the invention, in which there are stored peripheral data associated with user data and with configuration data;

Figure 1:
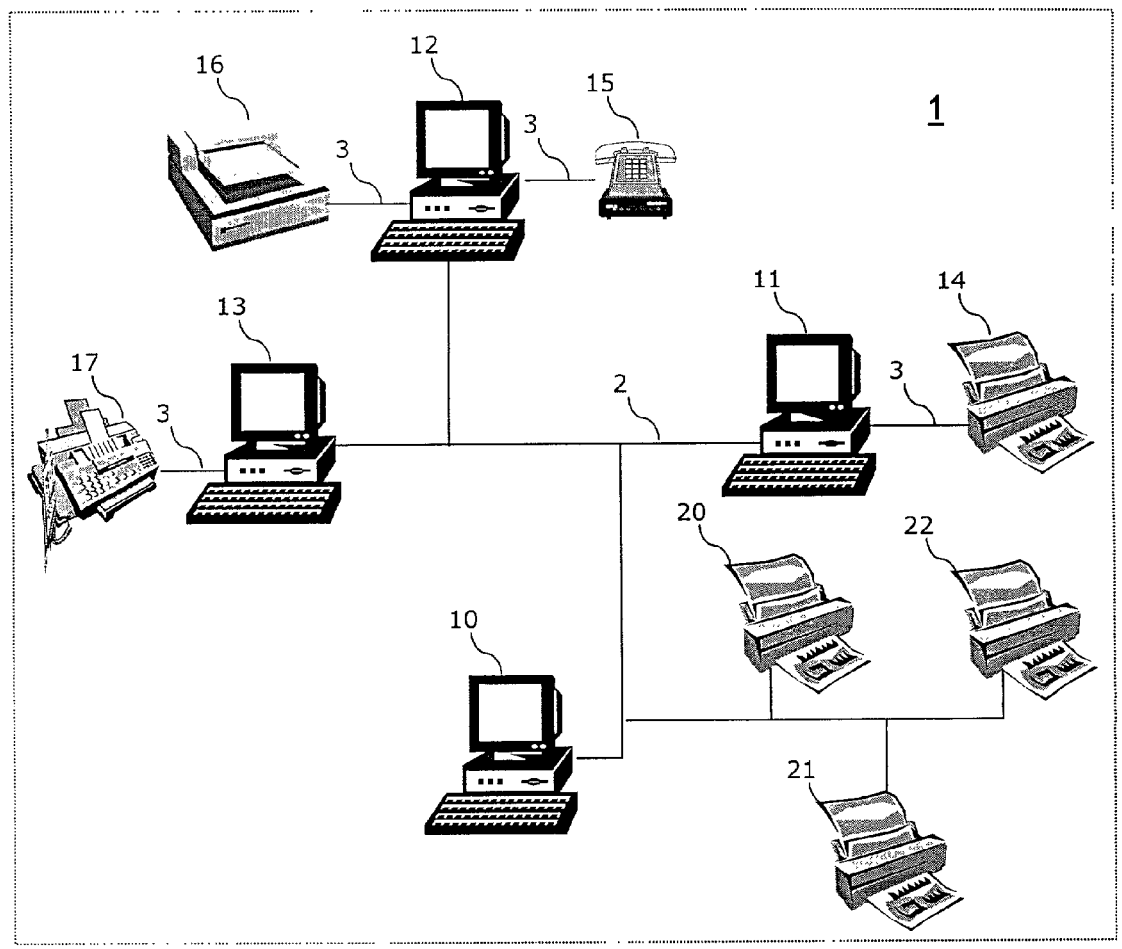
FIG. 1 illustrates the general architecture of a communication network adapted to implement the invention according to a preferred embodiment.

With reference to FIG. 1 a description will be given of an example of a network adapted to implement the invention.

The network 1 represents any type of network, for example a local area network (LAN) based on a known architecture such as Ethernet or Token Ring, or a metropolitan area network (MAN), for example a company network, or a wide area network (WAN) such as a world network like the Internet.

In the preferred embodiment described here, the network in question is the Internet.

The network 1 has a plurality of stations such as computers, and a plurality of peripherals, the peripherals being connected to the stations either by direct links 3, or through the network, by means of a set of links and nodes 2.

As illustrated in FIG. 1, the network 1 has four stations 10-13, for example microcomputers or workstations.

The network 1 uses the principle known as "client-server" for the exchange of information or services between the stations. According to this principle, applied by way of example to the transfer of documents, a so-called "client" station sends a request to transfer an electronic document to a so-called "server" station, which stores or which is associated with a computer which stores the requested document.

The client stations can be user systems, whilst the server stations can be network servers dedicated to supplying documents or services such as for example the printing of documents. However, each of the network stations in question can also, according to the direction of the transaction carried out, be "client" or "server".

Thus, in the network 1, the stations 11, 12, 13 are client stations vis-à-vis the station 10, which serves as an electronic document printing server. In this regard, the server station 10 manages access to three printers 20, 21, 22 connected to the network.

It should be noted here that "electronic document" means a set of data which can be of very varied natures: text file, image, video, sound, etc.

Processing peripherals of different types can be connected to these stations in order to implement different types of document processing: for example, a printer 14 is connected to the station 11, a modem 15 and a scanner 16 are connected to the station 12, and a facsimile machine 17 is connected to the station 13.

These processing peripherals 14, 15, 16, 17 are connected to the corresponding stations by specific connections (3) of appropriate types usual in cabled computer networks: for example, serial, parallel or SCSI (Small Computer Simple Interface).

In the context of the embodiment of the invention described and depicted here, the electronic document processing peripherals in question are printers (20, 22, 21); however, the invention also applies to other types of peripherals such as scanners or facsimile machines.

In the network depicted in FIG. 1, the client stations 11, 12, 13 can use, at a distance, the electronic document printing service dispensed by the server station 10. Moreover, different users can be connected to each of the client stations 11, 12 and 13.

The print server 10 offers the possibility to the client stations of using any one of the printers 20, 21, 22.

Figure 2:
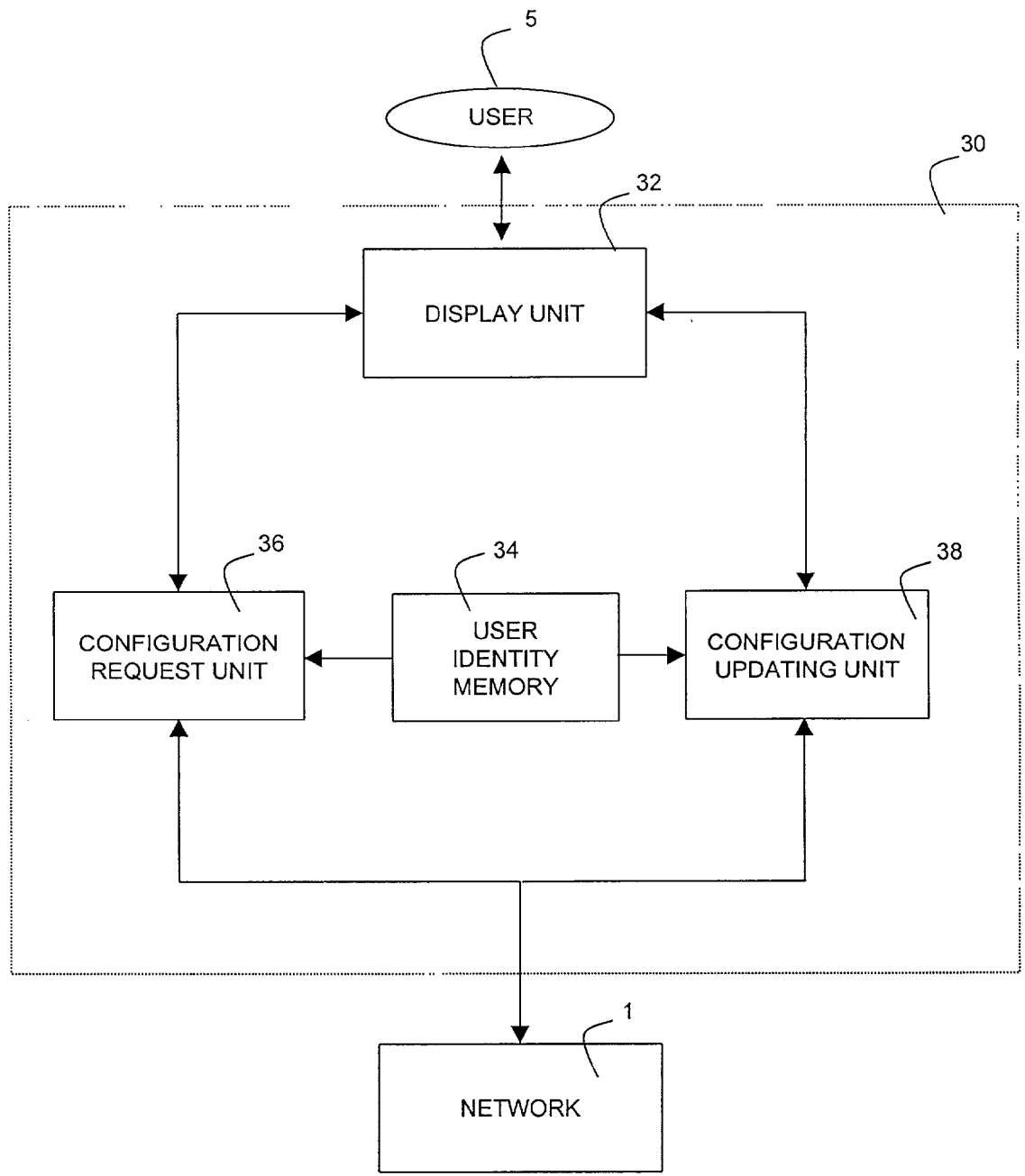
FIG. 2 is a functional diagram depicting the elements of a configuration device according to the invention, which are incorporated in a client station connected to a communication network.

FIG. 2 is a functional diagram depicting the elements of a configuration device according to the invention, which are incorporated in a client station (11, 12 or 13) connected to the network 10. These elements constitute the "client part" or "client device" of the peripheral configuration device according to the invention.

As depicted in FIG. 2, the client device 30 according to the invention includes the following elements:
a configuration request unit 36;
a user identity memory 34;
a configuration update unit 38;
a display unit 32.

The client device 30 as illustrated in FIG. 2 notably makes it possible to obtain a configuration profile determined according to a method implemented in the server station 10, and which will be described later in the description.

In accordance with the invention, the configuration request unit 36 has means for generating and sending to the server station 10 a request to configure a printer (20, 21 or 22), the configuration request containing user identification data and printer identification data.

Thus the function of the configuration request unit 36 is to generate and send to the server station 10, via the network 10, a request to configure a printer chosen by the user 5 amongst the printers 20, 21 or 22.

The object of the configuration request generated by the unit 36 is to obtain from the server station the configuration profile which applies to the printer chosen by the user, having regard to the identity of the user.

In this regard, the configuration request contains user identification data and printer identification data.

The user identification data is stored in the user identity memory 34. The configuration request unit 36 consequently extracts the user identification data from the memory 34 in order to incorporate it in a configuration request.

According to a preferred embodiment of the invention, the user identification data consists of the string of characters defining the user identification (UID) for the network or the station, and the password (PW) generally associated with it. The user enters his identification and password during a procedure for connection to the client station (login procedure). The client device has means for recovering the identification and the password of the user and storing them in the memory 34.

The printer identification data for its part is supplied by the application (software) from which the user triggers a configuration request process or a printing process. In one embodiment of the invention, this printer identification data is the network address of the printer, for example its IP (Internet Protocol) address.

In accordance with the invention, the configuration update unit 38 has means for receiving from the server station 10 a configuration profile for the chosen printer, in response to the configuration request.

Thus, in response to the configuration demand request sent to the server station 10 by the unit 36, the client station can receive from the server station, via the network 1, data representing the configuration profile applicable.

The update unit 38 also has means for modifying the current configuration associated with the configuration profile received from the server station 10.

The unit 38 also has means for sending to the server station 10, via the network 1, the configuration profile containing the modified configuration.

The display unit 32 of the client device 30 has means for displaying the configuration profile of the printer in question. To this end, the display unit 32 consists of a software component providing the function of interface with the user 5. Typically, the display unit is associated with a screen (not shown).

The display unit 32 thus makes it possible on the one hand to extract data from the units 36 and 38 in order to format them and present them to the screen, through adapted graphical interface software. In addition, the display unit 32 enables the user 5 to enter data which will then be transmitted, according to circumstances, to the configuration request unit 36 or to the configuration update unit 38.

The display unit 32 in particular enables the user 5 to see on the screen a menu enabling him to choose a printer and to transmit a configuration request order to the unit 36. The display unit 32 also enables the user to see the parameters of a current configuration in the context of a configuration profile transmitted by the configuration update unit 36, to modify these parameters, and to transmit them to the configuration update unit 38 so that this can send the modified configuration to the server station 10.

In practice, in order to enter data, such as for example in order to formulate a configuration request, or to modify a current configuration, the user can make use of a pointing device such as a mouse, or a keyboard.

A description will now be given, with reference to FIG. 3, of the elements of a configuration device according to the invention which are incorporated in the server station 10 connected to the network 1.

Figure 3:
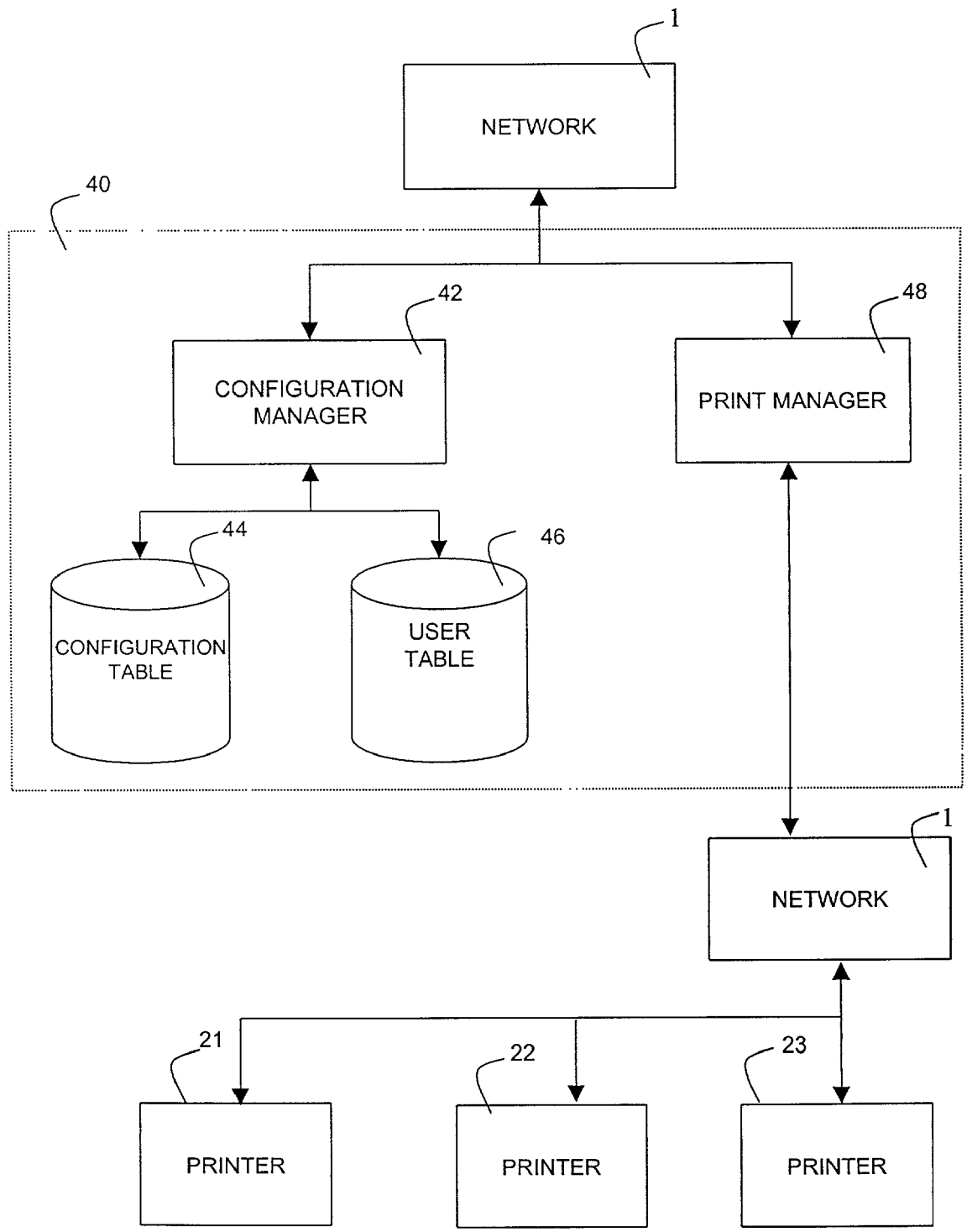
FIG. 3 is a functional diagram representing the elements of a configuration device according to the invention, which are incorporated in a server station connected to the communication station.

FIG. 3 is a functional diagram depicting these elements which make up the "server part" or "server device" of the peripheral configuration device according to the invention.

As depicted in FIG. 3, the server device 40 according to the invention includes the following elements:
- a configuration manager 42 associated with two tables;
- a so-called "configuration" table 44 and a so-called "user" table 46;
- a print manager 48.

The server device 30 as illustrated in FIG. 3 makes it possible to determine a configuration profile for a printer chosen by a user connected to a client station (11, 12 or 13). The configuration profile represents a set of configuration parameters of the printer. As mentioned above, a set of fixed values of these parameters defines a particular configuration of the printer. The set of these values at a given instant constitutes the current configuration at this instant.

In accordance with the invention, the configuration manager 42 has means for obtaining user identification data.

The user identification data is as described above in relation to FIG. 2, and this data item is incorporated in a configuration request sent by a client station of the network.

The configuration manager 42 also has means for determining user characteristics according to the aforementioned user identification data.

In a preferred embodiment of the invention, these user characteristics indicate a level of service subscribed to by the user.

According to a preferred embodiment of the invention, the level of service subscribed to by a user is described according to a financial sum paid by him. This is because the level of service can be relative to the amount of a payment made by the user, for example during an on-line subscription procedure, in order to be able to use the printers managed by the server. Thus, for example, according to the amount of the payment, the user will be able to print in colour or in black and white only, or use only a printer of a certain type and not the others.

In accordance with the invention, the print manager 42 has means for determining, according to the user profiles determined as explained above, a configuration profile applicable for configuring the printer chosen by the user.

In the preferred embodiment of the invention, in which the server device manages access to several printers (21, 22, 23) through the network 1, the print manager 42 also has means for obtaining printer identification data. This printer identification data, such as its network address, is extracted from the request sent by a client station.

The configuration profile applicable is then determined by the configuration manager 42, according to the user characteristics and the printer identification data.

In order to determine the applicable configuration profile, the configuration manager 42 uses the configuration table 44 and the user table 46, these two tables thus forming a database associated with the configuration manager 42. The tables 44 and 46 make it possible to associate with each other data representing the identity of a printer, the configuration data representing applicable configuration profiles, and user data representing user characteristics.

Tables 44 and 46 are updated regularly, for example according to the subscription of new users to the print service, or according to the installation of new document processing peripherals.

FIGS. 7 and 8 show respectively an example of a user table 45 in which there are stored user identification data associated with data representing user characteristics, and an example of a configuration table 44 in which there are stored peripheral data associated with user data and with configuration data. These two tables thus form a database associated with the configuration manager 42.

The user table 46 depicted in FIG. 7 has two registers. A first "User" register 700 contains user identifiers. A second "Level of service" register 702 contains identifiers for levels of service subscribed to by the users corresponding to the user identifiers stored in the first register. Thus, as shown in FIG. 7, the levels of service "1", "2", "3" correspond respectively to the users identified by the character strings "Fred", "John", "Bob".

The configuration table 44 shown in FIG. 8 contains three registers. A first "Peripheral" register 800 contains peripheral identifiers each consisting, in this example, of a character string defining a peripheral name. A second "Level of service" register 802 contains levels of service identifiers, the same as those in the table 46. Finally a third register, "Configuration profile" 804, contains identifiers each representing a configuration profile applicable.

In this way, in the table 44 illustrated in FIG. 8, a configuration profile is determined according to an identified peripheral and a level of service determined for this peripheral.

Thus, for the printer "printer1" with the level of service "1" there corresponds the configuration profile for printer: "P1.1". Likewise, for the facsimile machine "fax1" with the level of service "1" there corresponds the configuration profile for facsimile machine: "F1.1".

Consequently, in this example embodiment, the configuration manager 42 of the server device 40, in order to determine an applicable configuration profile, will commence by consulting the table 46 with, as input data, a user identifier, for example "Bob", for reading the level of service which corresponds to it, that is to say "2".

Next, the configuration manager 42 will consult the table 44 with, as input data, on the one hand a peripheral identifier chosen by the user in question, for example "printer2"; and on the other hand the level of service previously determined in the table 46, that is to say "2".

With these two input data, the configuration manager 42 will determine the applicable configuration profile, that is to say, in this example: "P2.2".

It should be noted that, in this example, the peripheral identifier is a name by which the peripheral is "known" to the network, for example "printer1", however, this identifier can be directly the network address corresponding to this peripheral.

In addition, in this example, the configuration profiles are defined in the table 44 by an arbitrary identifier, such as "P1.1" meaning in the example "profile for printer 1 corresponding to level of service 1". In this case, another table (not shown) is implemented in memory, which contains information on access to the computer object actually containing the configuration parameters corresponding to the configuration profile in question.

According to a preferred embodiment of the invention, the configuration data stored in the table 44 and each representing a configuration profile indicate the electronic address of a computer object containing a configuration profile.

Thus, when the network in question is the Internet, as is the case in a preferred embodiment of the invention, the electronic address of a computer object containing a configuration profile is an address of the "uniform resource locator" (URL) type. In practice, the computer object is then an object defined in an annotation language of the "extended markup language" (XML) type.

In this embodiment, use is made of the protocol known by the acronym HTTP as a communication protocol between the client stations and the server station. HTTP (Hypertext Transfer Protocol) is in fact the main transfer method employed by Web protocols on the Internet for moving data from a server to a client.

Two examples of an XML object defining a configuration profile are given below.

Let the following XML computer object, designated by "config1", be:

```
<object
    href="http://oceania/object/printer1/config1.xml">
    <unordered-sequence name="quality">
        <bool name="draft" value="true"/>
        <bool name="standard" value="false"/>
        <bool name="high" value="false"/>
    </unordered-sequence>
    <bool name="monochrome" value="true"/>
</object>
```

The object "config1" defines a configuration profile of a printer, for example the configuration profile associated with the identifier "P1.1" in table 44 illustrated in FIG. 8.

This profile solely enables a user to choose between several levels of quality: draft, standard and high. In addition, printing will take place solely in black and white (monochrome).

In the context of this configuration profile, the current configuration is as follows. The level of quality is "draft" since the value of the variable "draft" is "true".

Consider now the following XML computer object, designated by "config2":

```
<object
    href="http://oceania/object/printer1/config2.xml">
    <unordered-sequence name="quality">
        <bool name="draft" value="false"/>
        <bool name="standard" value="false"/>
        <bool name="high" value="true"/>
    </unordered-sequence>
    <bool name="fine" value="true"/>
```

-continued

```
    <unordered-sequence name="color">
        <bool name="monochrome" value="false"/>
        <bool name="color" value="true"/>
    </unordered-sequence>
</object>
```

The object "config2" defines another configuration profile of a printer, for example the configuration profile associated with the identifier "P1.3" in the table 44 illustrated in FIG. 8.

With respect to the previous profile "config1", the profile "config2" in addition enables a user to choose to print in colour or black and white (monochrome), and to print the text with more sharpness (fine).

In the context of this configuration profile, the current configuration is as follows. The level of quality is "high" since the value of the variable "high" is "true". The colour print mode is selected since the value of the variable "colour" is "true".

Returning to FIG. 3, the server device 40 has a print manager 48.

The function of the print manager is conventionally to enable the graphical instructions corresponding to a document to be printed to be translated into a code which can be understood by the printer selected for printing the document.

To this end, the print manager 48 (in English designated as "Print Processor" for example in the Windows® operating system from Microsoft Corporation) recovers the graphical orders previously stored and sends them in blocks to an order manager (not shown), which transmits them in turn to a printer driver (not shown). The printer driver is conventionally a software module dedicated to communication with the printer in question, which has its own operating software for performing a set of elementary operations.

The driver thus translates a complex operation requested by a high-level software application (for example word processor software executed in a client station) into a set of elementary operations which can be executed by the printer. The driver consequently effects a translation of a set of orders, for example graphical orders sent by a graphical instruction manager, into a set of printing instructions, referred to as print code, which can be read by the printer in question.

The print code is then returned to the graphical order manager by the printer driver, in order then to be sent to the printer, which can thus perform the printing proper of the document.

The operation of translating the orders into print code requires the prior configuration of the driver.

The configuration amounts to fixing the value of each parameter of this translation. These parameters concern for example the translation of the character font of a text into a series of dots able to be formed by the printer, or the colour palette of a document into a colour palette of the printer. These parameters also concern the colour or black and white print mode, the print quality, etc.

As mentioned above, a set of fixed values of these parameters constitutes a particular configuration of the printer. Thus the process normally referred to as "printer configuration" is in reality a process of configuring the printer driver of the printer.

In accordance with the invention, when a client station sends a request to print a document to the server station, the print manager 48 provides the configuration of the printer driver of the printer chosen by the user of the client station using the current configuration of the configuration profile which was determined, as explained above, by the configuration manager 42.

In relation to FIG. 4, a description will now be given of the steps of the configuration method according to the invention which are implemented in a client station connected to the communication network.

The client device 30 of the configuration device according to the invention makes it possible to implement in the client station a method of obtaining a configuration profile, this configuration profile being determined according to a method implemented in the server device 40 and which will be described later in relation to FIG. 5.

In accordance with the invention, this method comprises a step of generating and sending to the server station a request to configure a document processing peripheral, the request containing user identification data and peripheral identification data. In the context of the embodiment described and illustrated here, the peripheral is a printer. The abovementioned step will now be detailed.

Figure 4:
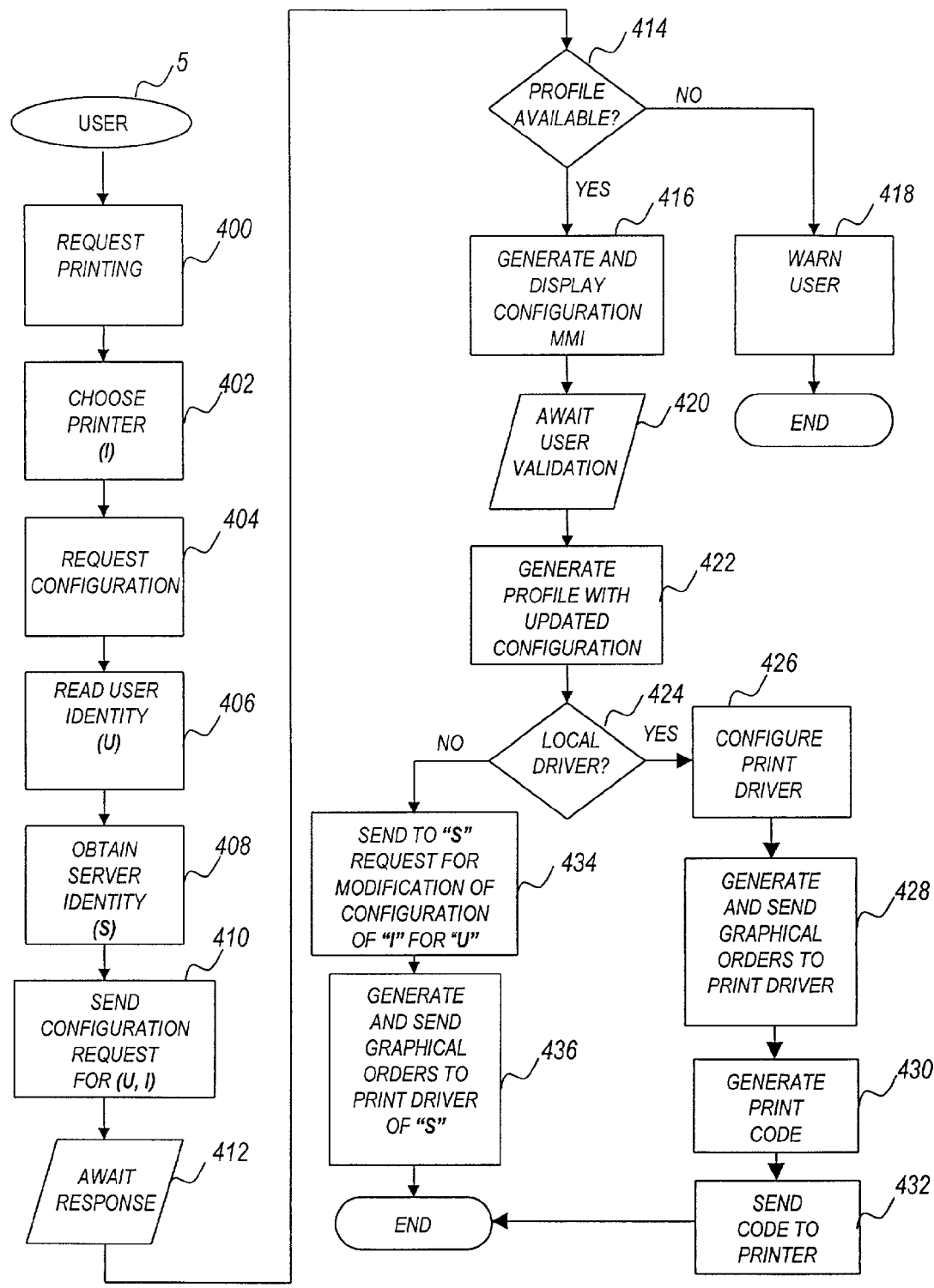
FIG. 4 is a flow diagram illustrating the steps of the configuration method according to the invention, which are implemented in a client station connected to the communication network.

In FIG. 4, initially, a user 5 makes a request to print a document (step 400 in FIG. 4), for example from an electronic document processing application such as word processor software. At the following step (402) the application from which the print request is made, or the display unit 32, offers to the user a choice of printers for effecting the printing. The user then chooses a printer identified by identification data (I).

At step 404 the user makes on the screen, through a dialogue window displayed by the display unit 32, a configuration request in order to obtain the configuration profile which applies to the selected printer. The configuration request is transmitted by the display unit to the configuration request unit 36 which is responsible for generating the configuration request.

To this end, the unit 36 commences by obtaining the identification data (U) for the user (step 406) by reading this data in the user identity memory 34.

It should be noted that, in FIG. 4, given by way of example, the configuration request (404) follows on from a request (400) to print a document used in an application. However, according to the invention, the user also has the possibility of making a configuration request in order to obtain the configuration profile to which he is entitled for a given peripheral, without for all that making a document print request. In this case, step 404 is directly executed.

At the following step (408) the configuration request unit 36 determines the identity (S) of the server responsible for managing the printer selected by the user. The identity of the server, for example its network address, is obtained for example by consulting a table stored in a memory of the client station, said table containing, for each printer accessible on the network, the identity of the server which is responsible.

At the following step (410) the configuration request unit generates the configuration request containing the user identification data (U) and the printer identification data (I); then sends this request via the network to the server station (S).

In accordance with the invention, the method of obtaining a configuration profile comprises a step of receiving, in the server station, a configuration profile of the peripheral in response to the configuration request.

This is because, after having sent the configuration request, the configuration update unit 38 then goes into a state of awaiting (step 412) the response from the server station to the configuration request.

The processing of the configuration request by the server station will be described below in relation to FIG. 5.

Still in FIG. 4, when the configuration update unit 38 of the client station receives the response from the server station to the configuration request, a test step (414) is performed, during which the response of the server is tested.

If no profile is available, this may be the case for example when the printer selected by the user is not authorised for this, or when the user is not recorded in the server (table 46), which is the case if the user has not taken out a subscription.

In this case, the user is advised (step 418), for example by displaying on the screen a message explaining the reasons for the lack of applicable configuration profile. In this case, the process implemented in the client station ends there.

In the contrary case, in accordance with the invention, the method of obtaining a configuration profile includes a step of displaying the profile received and a step of modifying the current configuration associated with the configuration profile.

This is because, if a configuration profile is contained in the response received from the server station (step 414), a "man-machine" interface (MMI) is generated and displayed on the screen (step 416). This MMI presents on the screen the current configuration of the configuration profile. For example, it is possible to display the object "config2" defined above in graphical form. Alternatively, it is possible to display this computer object directly in textual form, that is to say as presented above.

At the following step 420 there is a wait until the user modifies the parameters of his choice and validates this modification, for example by clicking with a mouse. To this end, the configuration update unit 38 waits until the display unit 32 sends it a signal indicating the validation of the modification to the current configuration.

When the user has validated the configuration update, at the following step (422), the configuration profile is generated once again in its initial format, for example in textual form.

In accordance with the invention, when the driver of the selected printer is stored in the server station, the configuration profile containing the modified configuration is sent to the server station. On the other hand, when the printer driver is stored locally in the client station, the configuration profile containing the modified configuration is used to configure the printer driver.

To this end, as illustrated in FIG. 4, a test step 424 is performed, during which it is determined whether or not the driver of the chosen printer is "local" (stored in the client station). If such is the case, at the following step (426), the printer driver is configured using the modified configuration of the configuration profile. Then, at step 428, the graphical orders corresponding to the document to be printed are generated and sent to the printer driver (local). The printer driver then translates (step 430) the orders into print code. The print code is finally sent to the printer (step 432), via the network or not, if the printer is connected directly to the client station, and the printing of the document is performed. The process implemented in the client station is then terminated.

Conversely, if the printer driver is not stored locally in the client station (test 424), at step 434, a configuration modification request is generated and sent to the server station. This request contains the user identification data ("U"), the printer identification data ("I") and the server identification data ("S").

Figure 6:
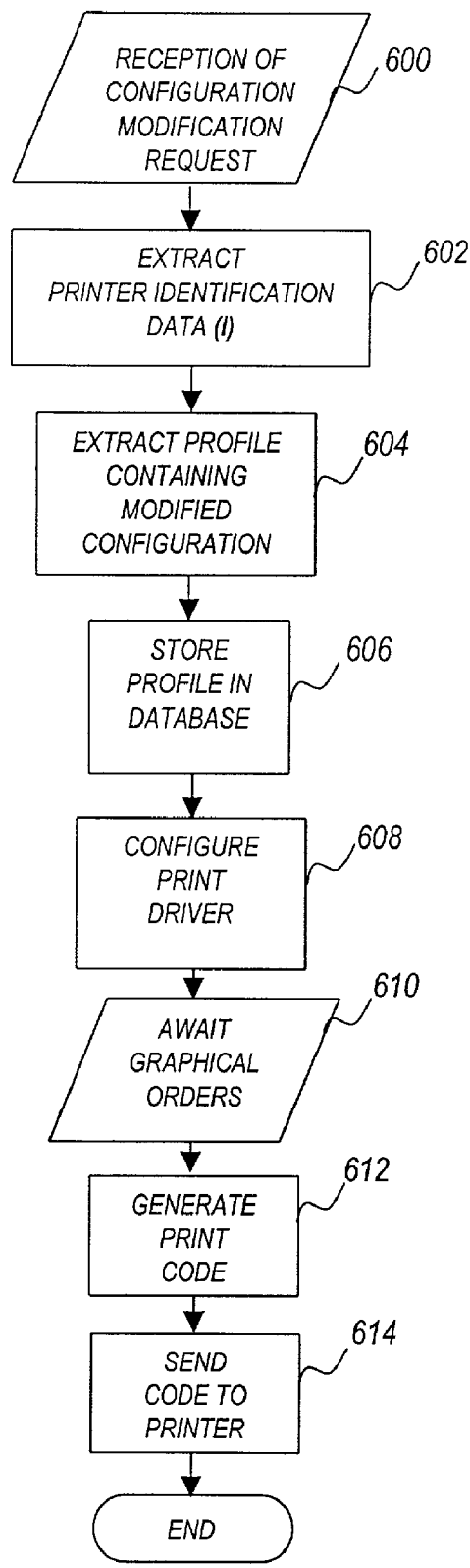
FIG. 6 is a flow diagram illustrating the steps, implemented in a server station, for modifying, at the request of a client station, the configuration of a peripheral according to a predetermined configuration profile.

The configuration modification request is then received and processed by the server device 40 according to a process which will be described below in relation to FIG. 6.

Finally, at step 436, the graphical orders relating to the document to be printed are generated and sent, via the network, to the server station in order to be delivered to the printer driver of the printer (c.f. FIG. 6, steps 610-614). The process implemented in the client station is then terminated.

In relation to FIG. 6, a description will be given of the steps the process, implemented in the server station, for processing the configuration modification request sent by the client station (step 434).

In the server station, the process begins at step 600 with the reception of the configuration modification request by the configuration manager 42 of the server device 40. At the following step (602), the printer identification data ("I") is extracted from the request. Then the configuration profile containing the modified configuration is extracted from the request (step 604). It is a case for example of a computer object of the XML computer object "config2" type mentioned above.

At step 606, the configuration profile received is stored in its storage place in a profile database (not shown) associated with the server station. The configuration profile is stored by "overwriting" the data relating to this profile stored previously at the same memory location. Thus, in the context of the profile example "config2", this memory location is defined by the following URL (uniform resource locator) address:

"http://oceania/object/printer1/config2.xml"

which is defined in a particular field (href) of the XML object constituting the profile. In this example, the configuration profile "config2" will be stored in a file "config2.xml" contained in a memory resource (for example a hard disk) of the print server known to the network by the name "oceania".

Thus, through steps 604 and 606, the configuration manager 42 has updated the current configuration of the printer in the context of the applicable configuration profile, in response to the request (step 600) received from the client station.

At the following step (608), the updated configuration, contained in the previously stored configuration profile (step 606), is used for configuring the printer driver stored in the server.

The following step, 610, is a waiting step, during which the print manager 48 waits until it receives, from the client station, the graphical orders relating to the document to be printed (FIG. 4, step 436).

When these orders are received, the printer driver generates the print code (step 612). Finally, at the final step 614, the print code is sent to the printer by the print manager 48, so that the printing of the document in question is carried out.

In relation to FIG. 5, a description will now be given of the method, according to the invention, of determining a configuration profile for a document processing peripheral. This method is implemented in the server station following on from the sending of a configuration request by the client station (cf. FIG. 4, step 410).

Figure 5:
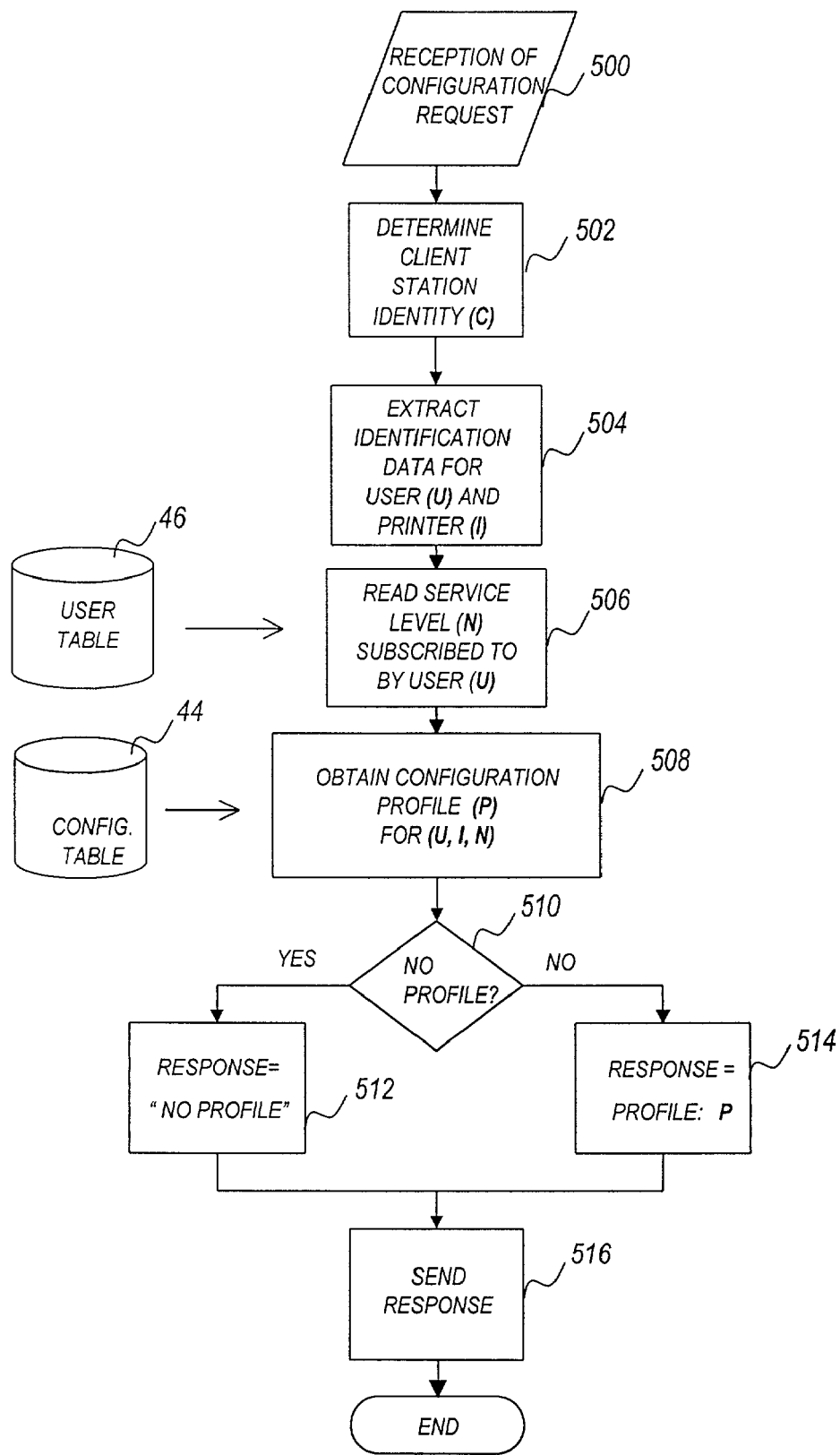
FIG. 5 is a flow diagram illustrating the method of determining a configuration profile for an electronic document processing peripheral, in accordance with the invention.

In FIG. 5, the method of determining a configuration profile according to the invention begins with a step 500 of receiving, by the configuration manager 42, a configuration request coming from the client station in question (FIG. 4, step 410).

At the following step 502, the identity ("C") of the client station originating the configuration request is extracted from the request. In practice, this identity is the network address (for example the IP address) of the client station. Determination of the identity of the client station is necessary so that the configuration manager 42 can, at the end of the process, send a response to the client station (step 516).

At the following step, 504, the user identification data ("U") and the identification data ("I") of the printer chosen by the user are extracted from the request.

It should be noted that, in the example described and illustrated by FIG. 5, the user identification and printer identification data are extracted from the request sent by the client station to the server station, the request being a configuration request, that is to say a request to obtain a configuration profile. However, the request in question may be directly a document processing request, that is to say, in the embodiment described, a print request.

At the following step (506), the configuration manager 42 consults the user table 46 in order to determine the level of service ("N") subscribed to by the user (U) identified by the user identification data extracted from the request (504). Thus user characteristics are determined according to the user identification data.

At the following step (508), the configuration manager consults the configuration table 44 in order to obtain a configuration profile of the printer identified according to the level of service determined at the previous step (506). Thus a configuration profile applicable for configuring the printer is determined according to the user characteristics (level of service) determined previously.

However, it may happen that, during step 506, the user identified is not recorded in the user table 46, or the printer selected by the user does not form part of the printers authorised, in the context of the level of service identified, for this user. In this case, at step 508, no configuration profile is obtained.

So as to detect the previous situation, a test step 510 is executed, during which a test is carried out to determine whether a configuration profile has been obtained.

If no profile has been determined, the configuration manager 42 generates a response (step 512) containing an appropriate message signifying the absence of a found profile. In the contrary case, the response generated (step 514) contains the configuration profile which has been determined.

Finally, the process ends at step 516, during which the response, containing a configuration profile or not, is sent to the client station ("C") identified previously at step 502.

Figure 9:
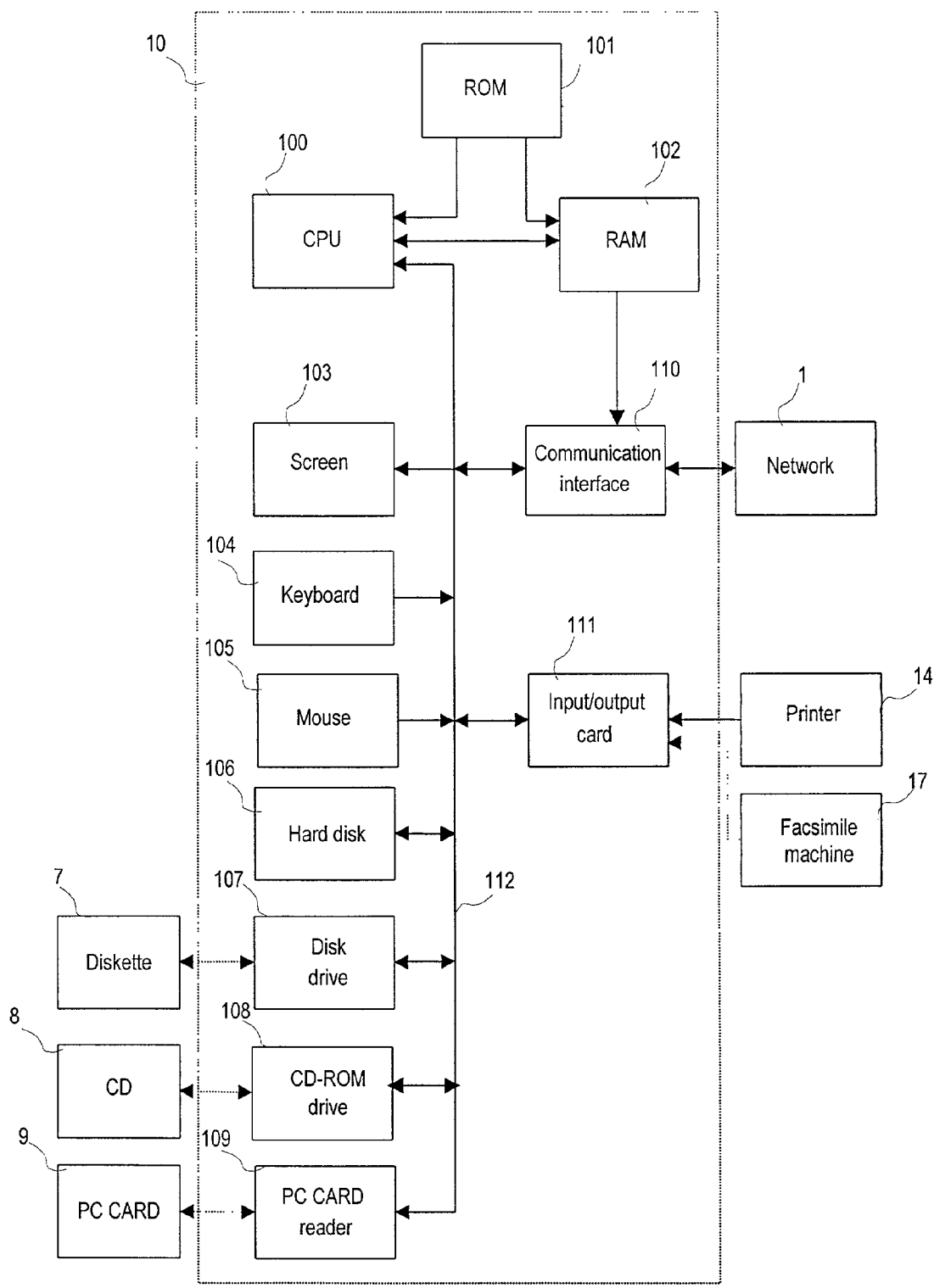
FIG. 9 is a block diagram representing a computer able to incorporate the elements of the client part and/or of the server part, of the device for configuring a document processing peripheral according to the invention.

With reference now to FIG. 9, a description will be given of a computer adapted to incorporate the components constituting the server part and/or the client part of the configuration device according to the present invention described above, notably in relation to FIGS. 2 and 3.

This is because the client device and the server device can be incorporated in the same station, when for example the station is used in an isolated manner (in English "stand-alone") without connection with a network; or when the peripheral or peripherals are directly connected to the station; or again, when the station, connected to a network, is a client for certain peripherals accessible on a network, or a server for other peripherals.

Naturally, in an equivalent fashion, this computer comprises, consequently, means able to implement a configuration method (server part and/or client part) for a computer peripheral according to the invention and described above, notably in relation to FIGS. 4 to 6.

In this embodiment, the means constituting the peripheral configuration device according to the invention are essentially software components or programs.

Consequently, these software components contain one or more sequences of instructions whose execution by said computer makes it possible to implement the methods according to the invention.

In FIG. 9, the computer 10, which may typically be a microcomputer or a workstation, has in a conventional fashion a central unit (CPU) 100, connected to a read only memory (ROM) 101 and a random access memory (RAM) 102, and to a data bus 112.

The data bus 112 allows communication between the different sub-elements of the computer 10, or the elements which are connected to it. However, communication between the different sub-elements of the computer is not limited to the bus 112. In particular, the central unit 100 is able to communicate instructions to any sub-element of the computer 10 directly or by means of another sub-element of the computer 10.

The computer 10 has a communication interface 110 connected to a communication network such as the network 1 (depicted in FIG. 1) such as the Internet and able to receive documents, for example of the type using HTML (HyperText Markup Language). This communication interface 110 comprises for example a modem of a type known to a skilled person.

The computer 10 also has in a conventional manner a storage means 106 such as for example a hard disk. It may also have a disk drive 107, a CD-ROM drive 108 and a reader for cards of the so-called PC-CARD format 109.

A diskette 7, a compact disc (CD) 8, a card 9 of the PC-CARD type, intended to be read respectively by the disk drive 107, the CD-ROM drive 108 and the card reader 109, as well as the hard disk 106, can be used for storing electronic documents, and for storing the software code for implementing the configuration method according to the invention.

According to a preferred embodiment, the executable code of the program for implementing the configuration method is stored in the hard disk 106.

According to a variant embodiment, the executable code of this program is stored in the ROM 101.

According to another variant embodiment, the executable code of the program can be downloaded from the communication network 1 via the communication interface 110 in order to be stored on the hard disk 106.

The communication interface 110 has for example a program product known as a "Web browser".

When the program is executed, the variables created and modified are stored in registers in the RAM 102.

The computer 3 also has a screen 103 for serving as a graphical interface between the program according to the invention and the user, the latter being able to make requests by means for example of a pointing device such as a mouse 105, or else by means of a keyboard 104.

The computer 10 also has various peripherals, such as a printer 14 making it possible for example to print downloaded documents, or a facsimile machine 17. These peripherals are connected to the computer via an input/output card 111.

Naturally, many modifications can be made to the embodiments of the invention described above without departing from the scope of the invention.

The invention claimed is:

1. A method of determining a configuration profile for an electronic document processing peripheral device, the configuration profile representing a set of configuration parameters defining an operating mode of the peripheral device, a set of fixed values of the parameters defining a particular configuration of the peripheral device, said method implemented in a communication network that includes at least one client station, at least one server station and at least one processing peripheral device comprising the steps of:

obtaining a user identification data item from a request sent by a client station operated by said user;

determining user characteristics as a function of the user identification data item, the user characteristics comprising a level of service associated with said user;

obtaining a peripheral device identification data item from said request;

determining, as a function of the user characteristics and of the peripheral device identification data item obtained, a configuration profile applicable for configuring the operating mode of the peripheral device for a document processing request coming from said user, wherein the determining step further comprises a limiting step of limiting the possible values of certain configuration parameters of the peripheral device as a function of the level of service associated with the user; and sending the configuration profile determined to the client station operated by said user, wherein the user characteristics indicate a level of service subscribed to by the user, and wherein the level of service subscribed to by the user is defined according to a financial sum paid by the user.

2. A method according to claim 1, wherein the peripheral device identification data item is extracted from the request sent by a client station to the server station, the request being a document processing request or a request to obtain a configuration profile.

3. A method according to claim 2, wherein said steps of determining user characteristics and determining a configuration profile are accomplished by means of a database in which there are stored, associated together, peripheral device data each representing an identity of a peripheral, user data representing user characteristics, and configuration data each representing a configuration profile.

4. A method according to claim 1, further comprising the step of:

if required by the client station, updating a configuration of the peripheral device in a context of the configuration profile applicable.

5. A method according to claim 4, wherein said configuration updating step includes:

receiving from the client station a request for obtaining the configuration profile applicable;

determining and sending to the client station the configuration profile applicable; and receiving from the client station the configuration profile applicable with a parameter having a modified value.

6. A method according to claim 1, wherein the user identification data item is a chain of characters identifying a user and a password entered by the user in order to connect the user to the client station.

7. A method according to claim 1, wherein the peripheral device identification data item is a network address of the peripheral.

8. A method according to claim 3, wherein the configuration data each represent a configuration profile indicate an electronic address of a computer object containing a configuration profile.

9. A method according to claim 1, wherein the network is an Internet.

10. A method according to claim 8, wherein the client station and the server station communicate using an HTTP protocol.

11. A method according to claim 10, wherein the electronic address of a computer object containing a configuration profile is an address of a uniform resource locator (URL) type, and the computer object is an object defined in an annotation language of an extended mark-up language (XML) type.

12. A method of obtaining a configuration profile determined according to a method as defined in claim 1, comprising the following steps implemented in a client station:

generating and sending to the server station a request to configure an electronic document processing peripheral device, the request including a user identification data item and a peripheral device identification data item; and receiving a configuration profile of the peripheral device from the server station, in response to the configuration request.

13. A method according to claim 12, further comprising the steps of:

displaying the configuration profile; and modifying a current configuration associated with the configuration profile.

14. A method according to claim 13, in which the peripheral device configuration uses a peripheral device driver, further comprising the step of, when the peripheral device driver is stored in the server station:

sending to the server station the configuration profile containing the modified configuration.

15. A method according to claim 13, in which the configuration of the peripheral device uses a peripheral driver, further comprising the step of, when the peripheral device driver is locally stored in the client station:

using the configuration profile for configuring the peripheral device driver.

16. A method of configuring an electronic document processing peripheral device, said method comprising determining a configuration profile in accordance with claim 1.

17. A method according to claim 1, wherein the peripheral device identification data item is extracted from the request sent by a client station to the server station, the request being a request to obtain a configuration profile.

18. A method according to claim 1, wherein a number of possible values of configuration parameters of the peripheral device contained in the determined configuration profile depends on the level of service associated with the user.

19. A method according to claim 1, wherein the highest level of service is associated to a configuration profile including all possible values of all configuration parameters.

20. A device for determining a configuration profile for an electronic document processing peripheral device, the configuration profile representing a set of configuration parameters defining an operating mode of the peripheral device, a set of fixed values of the parameters defining a particular configuration of the peripheral device in a communication network that includes at least one client station, at least one server station and at least one processing peripheral device, said device comprising:

means for obtaining a user identification data item from a request sent by a client station operated by said user;

means for obtaining a peripheral device identification data item;

first determining means for determining user characteristics as a function of the user identification data item, the user characteristics comprising a level of service associated with said user;

second determining means for determining, as a function of the user characteristics and the peripheral device identification data item, a configuration profile applicable for configuring the operating mode of the peripheral device for a document processing request coming from said user, wherein the first determining means further comprises a limiting means for limiting the possible values of certain configuration parameters of the peripheral device as a function of the level of service associated with the user; and means for sending the configuration profile determined to the client station operated by said user, wherein the user characteristics indicate a level of service subscribed to by the user, and wherein the level of service subscribed to by the user is defined according to a financial sum paid by the user.

21. A device for determining a configuration profile for an electronic document processing peripheral device, the configuration profile representing a set of configuration parameters for the peripheral device, a set of fixed values of the parameters defining a particular configuration of the peripheral device in a communication network that includes at least one client station, at least one server station and at least one processing peripheral device, said device comprising:

means for obtaining a user identification data item;

means for obtaining a peripheral device identification data item;

first determining means for determining user characteristics as a function of the user identification data item, the user characteristics comprising a level of services associated with the user;

second determining means for determining, as a function of the user characteristics and the peripheral device identification data item, a configuration profile applicable for configuring the peripheral device;

means for obtaining a peripheral device identification data item, such that a configuration profile applicable is determined as a function of the user characteristics and the peripheral device identification data item; and means for determining a configuration profile; and means for sending the configuration profile determined to the client station operated by said user, wherein the user identification data item and the peripheral device identification data item are extracted from a request sent by a client station operated by the user to a server station, the request being a document processing request or a request to obtain a configuration profile, wherein the user characteristics indicate a level of service subscribed to by the user, and wherein the level of service subscribed to by the user is defined according to a financial sum paid by the user.

22. A device for configuring an electronic document processing peripheral device, wherein said device includes a device for determining a configuration profile for an electronic document processing peripheral device, the configuration profile representing a set of configuration parameters defining an operating mode of the peripheral device, a set of fixed values of the parameters defining a particular configuration of the peripheral device in a communication network that includes at least one client station, at least one server station and at least one processing peripheral device, said device for determining a configuration profile comprising:

means for obtaining a user identification data item from a request sent by a client station operated by said user;

means for obtaining a peripheral device identification data item;

first determining means for determining user characteristics as a function of the user identification data item, the user characteristics comprising a level of service associated with said user;

second determining means for determining, as a function of the user characteristics and the peripheral device identification data item, a configuration profile applicable for configuring the operating mode of the peripheral device for a document processing request coming from said user, wherein the first determining means further comprises limiting means for limiting the possible values of certain configuration parameters of the peripheral device as a function of the level of service associated with the user; and means for sending the configuration profile determined to the client station operated by said user, wherein the user characteristics indicate a level of service subscribed to by the user, and wherein the level of service subscribed to by the user is defined according to a financial sum paid by the user.

23. A server station connected to a communication network, said server station comprising a device for determining a configuration profile for an electronic document processing peripheral device, the configuration profile representing a set of configuration parameters defining an operating mode of the peripheral device, a set of fixed values of the parameters defining a particular configuration of the peripheral device in a communication network that includes at least one client station, at least one server station and at least one processing peripheral device, said device comprising:

means for obtaining a user identification data item from a request sent by a client station operated by said user;

means for obtaining a peripheral device identification data item;

first determining means for determining user characteristics as a function of the user identification data item, the user characteristics comprising a level of service associated with said user;

second determining means for determining, as a function of the user characteristics and the peripheral device identification data item, a configuration profile applicable for configuring the operating mode of the peripheral device for a document processing request coming from said user, wherein the first determining means further comprises limiting means for limiting the possible values of certain configuration parameters of the peripheral device as a function of the level of service associated with the user, and means for sending the configuration profile determined to the client station operated by said user, wherein the user characteristics indicate a level of service subscribed to by the user, and wherein the level of service subscribed to by the user is defined according to a financial sum paid by the user.

24. A communication network comprising:
at least one processing peripheral device;
a server station; and
a client station, wherein said server station includes a device for determining a configuration profile for the electronic document processing peripheral device, the configuration profile representing a set of configuration parameters;

defining an operation mode of the peripheral device, a set of fixed values of the parameters defining a particular configuration of the peripheral device, the device comprising:

means for obtaining a user identification data item from a request sent by a client station operated by said user:

means for obtaining a peripheral device identification data item;

first determining means for determining user characteristics as a function of the user identification data item, the user characteristics comprising a level of service associated with said user; and second determining means for determining, as a function of the user characteristics and the peripheral device identification data item, a configuration profile applicable for configuring the operating mode of the peripheral device for a document processing request coming from said user and means for sending the configuration profile determined to the client station operated by said user, wherein the first determining means further comprises limiting means for limiting the possible values of certain configuration parameters of the peripheral device as a function of the level of service associated with the user, wherein said client station includes a device for obtaining a configuration profile for an electronic document processing peripheral device, the configuration profile representing a set of configuration parameters defining an operating mode of the peripheral device, a set of fixed values of the parameters defining a particular configuration of the peripheral device, said device comprising:

means for generating and sending to the server station a request for configuration of an electronic document processing peripheral device, the request containing a user identification data item and a peripheral device identification data item; and means for receiving a configuration profile of the peripheral device from the server station, in response to the request for configuration wherein the user characteristics indicate a level of service subscribed to by the user, and wherein the level of service subscribed to by the user is defined according to a financial sum paid by the user.

* * * * *